United States Patent
Suzuki

(10) Patent No.: US 6,861,171 B1
(45) Date of Patent: Mar. 1, 2005

(54) GASKET ASSEMBLY

(75) Inventor: Daisuke Suzuki, Northville, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 365 days.

(21) Appl. No.: 09/723,077

(22) Filed: Nov. 27, 2000

(51) Int. Cl.$^7$ ................................................. H01M 8/10
(52) U.S. Cl. ............................. 429/34; 429/35; 429/36; 429/39
(58) Field of Search ............................ 429/30, 33, 34, 429/35, 36, 38, 39, 41, 44, 37

(56) References Cited

U.S. PATENT DOCUMENTS

| | | | | |
|---|---|---|---|---|
| 3,660,166 A | * | 5/1972 | Winsel | ........................ 429/26 |
| 3,994,764 A | | 11/1976 | Wolinski | |
| 5,399,184 A | * | 3/1995 | Harada | ...................... 29/623.4 |
| 5,464,700 A | | 11/1995 | Steck et al. | |
| 5,910,378 A | * | 6/1999 | Debe et al. | .................... 429/42 |
| 6,057,054 A | * | 5/2000 | Barton et al. | .................. 429/42 |
| 6,080,503 A | | 6/2000 | Schmid et al. | |
| 6,183,898 B1 | * | 2/2001 | Koschany et al. | ............ 429/42 |
| 6,207,310 B1 | * | 3/2001 | Wilson et al. | ................ 429/26 |
| 6,368,476 B1 | * | 4/2002 | DeMarinis et al. | ......... 204/284 |
| 6,372,376 B1 | * | 4/2002 | Fronk et al. | ................... 429/41 |
| 6,399,234 B2 | * | 6/2002 | Bonk et al. | .................... 429/32 |

* cited by examiner

*Primary Examiner*—Michael Barr
*Assistant Examiner*—Monique Wills
(74) *Attorney, Agent, or Firm*—Ronald W. Wangerow; Casimir R. Kiczek

(57) ABSTRACT

A static gasket adapted to seal a joint between a first member and a second member, the joint having a clamp load applied to the first and second members. The gasket including a carrier member having a first side sand an opposite sides. An elastomeric member is on the carrier member. The elastomeric member has a tab portion and a sealing portion on the first side and an adhesive layer is on the opposite side. Thus, the carrier adheres to one of the first and second members to ease the assembly of one of the first member and second members to each other and the carrier member is conformable to improve the seal between the seal between the first member and the second member.

10 Claims, 5 Drawing Sheets

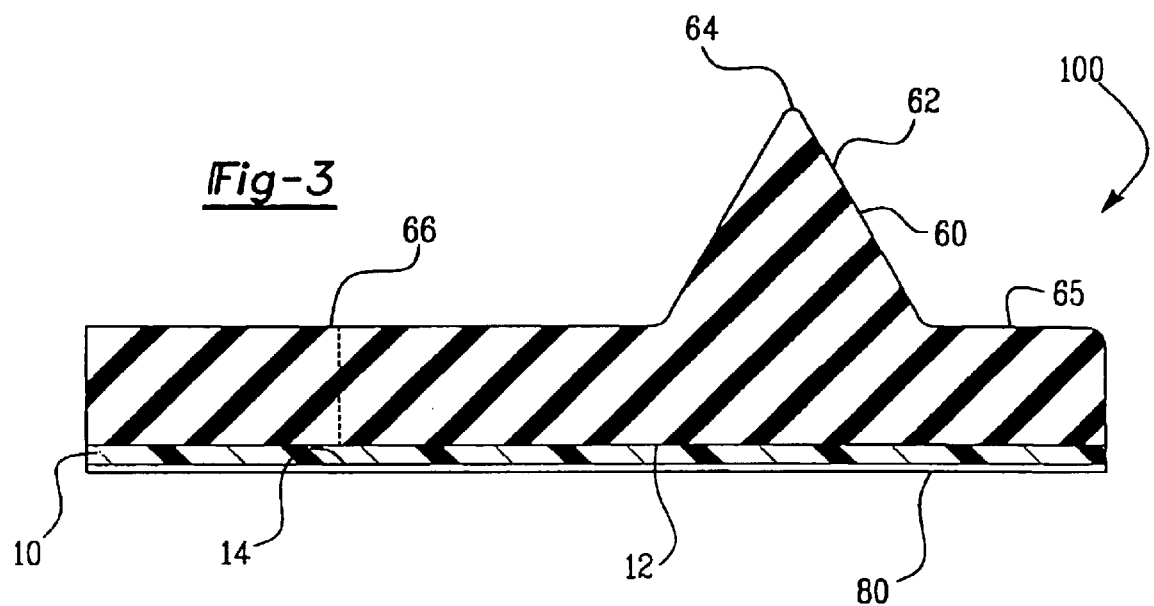
Fig-3
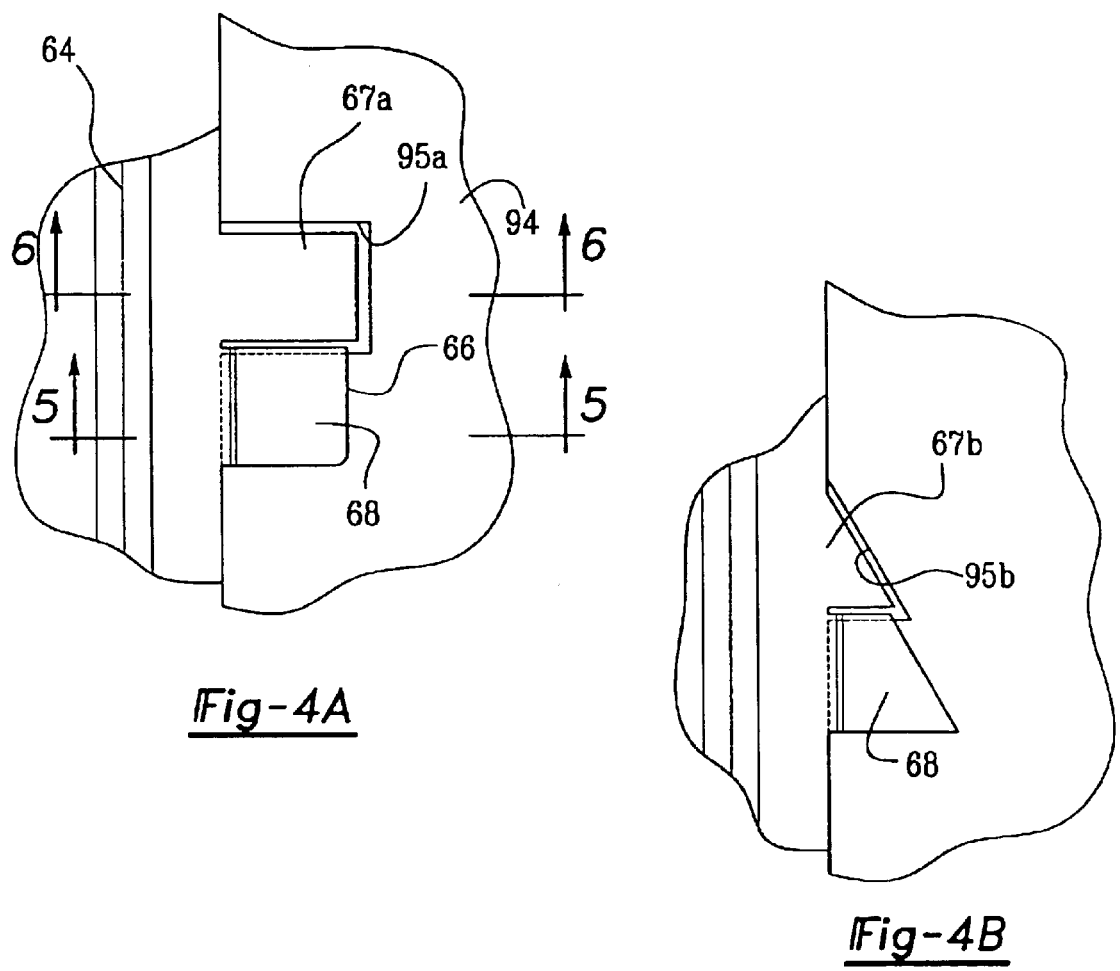
Fig-4A
Fig-4B

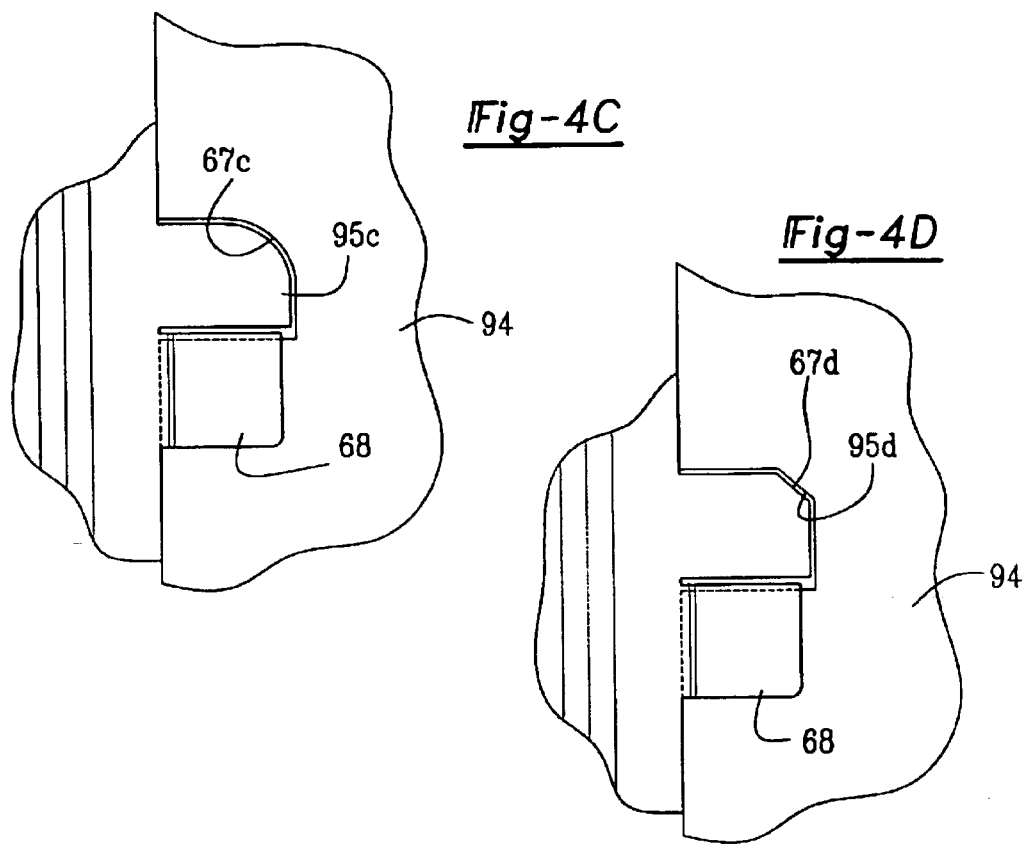
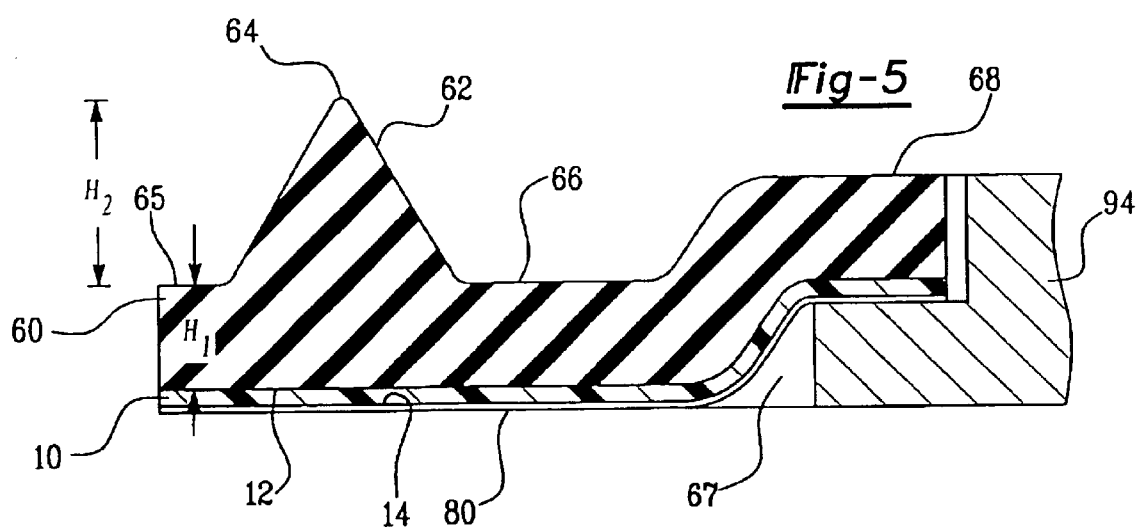

GASKET ASSEMBLY

BACKGROUND OF THE INVENTION

The present invention is relates to seals and particularly to static gaskets for various encapsulating covers and especially fuel cells.

Fuel cells are one of the leading alternate fuel powerplant candidates which, if commercialized, can dramatically reduce urban air pollution, decrease oil imports, reduce trade deficits and produce more jobs. Fuel cells are being developed for both portable and stationary electrical power generation.

A fuel cell is an electrochemical energy converter consisting of two electrodes which sandwich an electrolyte. In one form being developed for both portable and stationary applications, an ion-conducting polymer electrolyte membrane is disposed between two electrode layers to form a membrane electrode assembly (MEA). The MEA is typically porous and electrically conductive to promote the desired electrochemical reaction from two reactants. One reactant, oxygen or air, passes over one electrode and hydrogen, the other reactant, passes over the other electrode to produce electricity, water and heat.

An individual cell includes an MEA placed between a pair of separator plates. The separator plates are typically fluid impermeable and electrically conductive. Fluid flow passages or channels are formed on each plate surface adjacent to the electrode layer to facilitate access of the reactants to the electrodes and the removal of the products of the chemical reaction. In such fuel cells, resilient gaskets or seals are typically provided between the faces of the MEA and the perimeter of each separator plate to prevent leakage of the fluid reactant and product streams.

In U.S. Pat. No. 5,464,700, an elastomeric gasket is placed on either side of the ion conducting membrane and the two electrode layers are placed on the gasket to form a five layered gasketed MEA. The gaskets are difficult to assemble because they are flexible and they have a tendency to twist. This makes proper alignment of the five components time consuming and prone to misassembly. Thus., this gasket has not been widely adapted.

U.S. Pat. No. 6,080,503 discloses an integral seal with an adhesive bond that is formed between pairs of separator plates and the MEA. Alternatively, adjoining pairs of separator plates in the fuel cell stack are adhesively bonded together. Such an arrangement is easier to assemble and less prone to misalignment but does not facilitate the repair and/or removal of separator plates after the stack has been assembled. It has been found that it is difficult to disassemble the adhesively bonded stack without tearing the MEA or causing the separator plate, which may be brittle, to break.

Another solution using an integral seal that circumscribes the MEA is disclosed in U.S. Pat. No. 6,057,054. In this case, the sealing material is impregnated into the porous electrode layers near the sealing region. This seal has also been found to be difficult to make without damaging the MEA.

Thus there is a need for a reusable fuel cell stack which can prevent leakage of fluid reactants and product streams that can be easily assembled to the ion conducting polymer electrolyte membrane and the two electrode layers and the corresponding mating separator or flow field plates.

SUMMARY OF THE INVENTION

The present invention seeks to solve the above problems. The elastomeric gasket is adapted for sealing a flow field plate, a gas diffusion layer and an ion exchange polymer membrane in a fuel cell stack. The gasket includes a carrier member which has a first side and an opposite side. An elastomeric member has a tab portion and a sealing portion on the first side. A pressure sensitive adhesive layer is applied to the opposite side whereby the adhesive layer is adjacent to the ion exchange polymer member, the gas diffusion layer is adjacent to the tab portion and the sealing portion is adjacent to the flow field plate.

These and other features of the present invention will become apparent from the subsequent descriptions and drawings.

BRIEF DESCRIPTION OF THE DRAWINGS

FIG. 3 is an enlarged partial cross-sectional view of the gasket;

FIG. 4A is one alternative embodiment of the tab;

FIG. 4B is a second alternative embodiment of the tab;

FIG. 4C is a third alternative embodiment of the tab;

FIG. 4D is a fourth alternative embodiment of the tab;

FIG. 5 is an enlarged cross-sectional view of the gasket along line 5—5 of FIG. 4A;

DETAILED DESCRIPTION OF THE PREFERRED EMBODIMENTS

Figure 1:
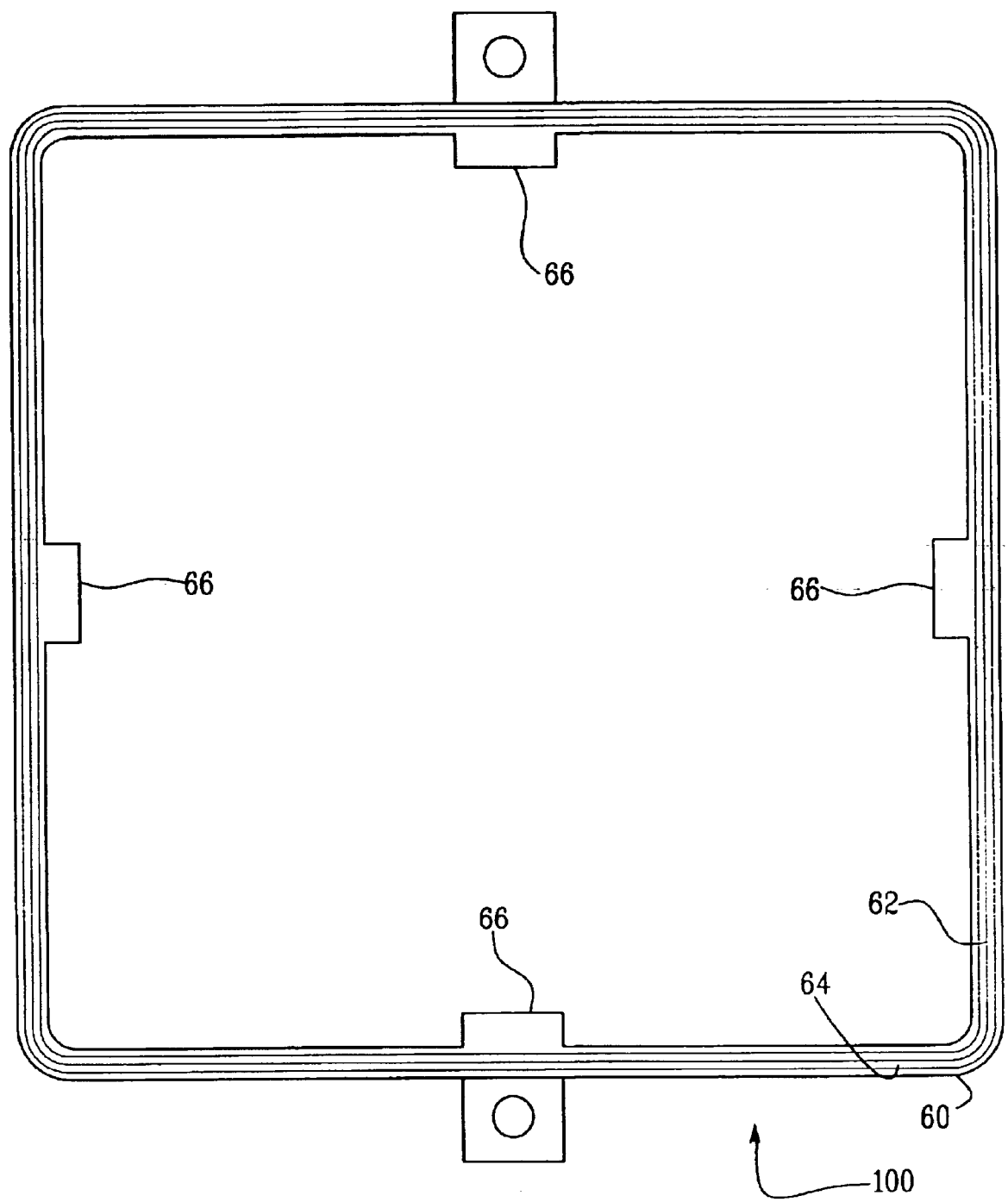
FIG. 1 is a top view of the gasket according to the invention.
Figure 2:
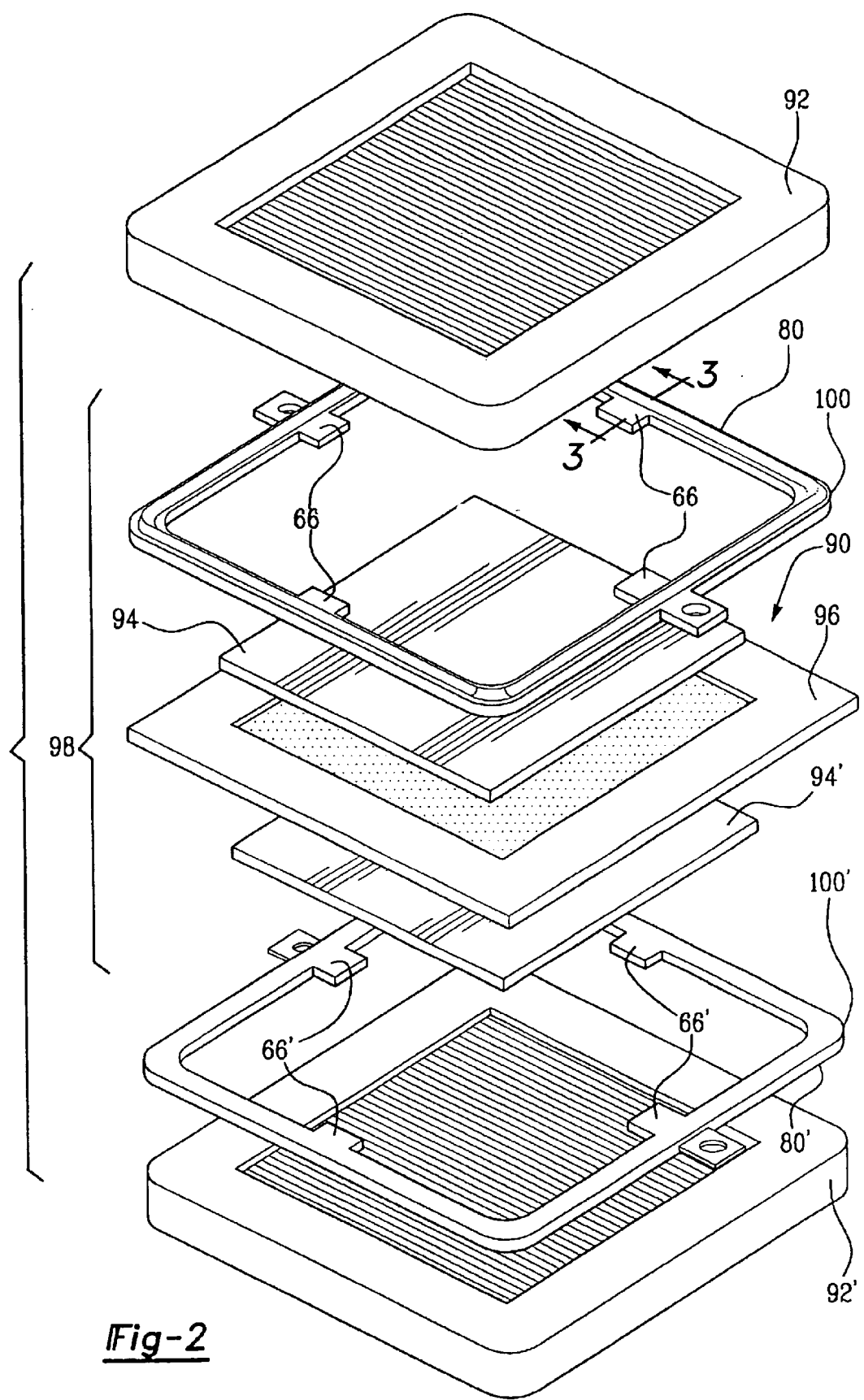
FIG. 2 is an exploded view of a fuel cell with gaskets according to the invention.
Figure 6:
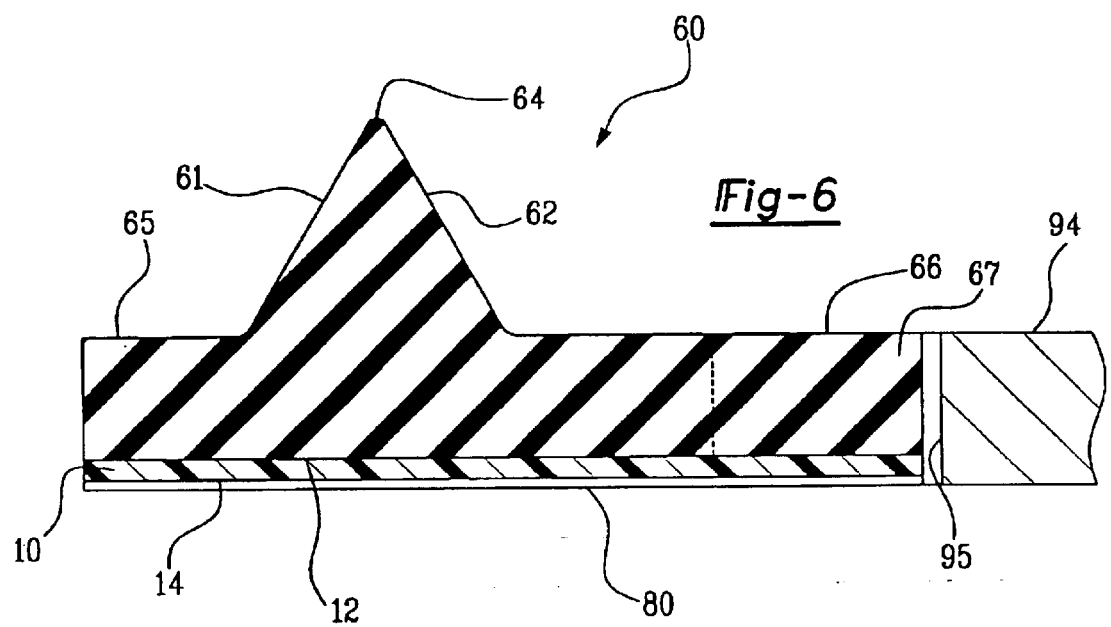
FIG. 6 is an enlarged cross-sectional view of the gasket along line 6—6 of FIG. 4A.

FIGS. 1–6 show an elastomeric static gasket according to the present invention, designated by the numeral 100. The invention is drawn to both the apparatus and the process for making the gasket 100. The gasket 100 seals fluid. The fluid may be a gas or liquid, a mixture of both, or solid particles entrained in a fluid such as dust in air or dirt in air. The liquid may be water, oil, fuel, anti-freeze, air conditioning fluid or any other similar material. The gas may be water vapor, hydrogen, air, oxygen, nitrogen, carbon dioxide, air conditioning vapor, fuel vapor, lubricating vapor or any other similar material. While the invention is shown as used in a fuel cell stack, this is not to be taken as a limitation of the invention since the gasket 100 may have other applications such as, for example, sealing a joint between an encapsulating cover with a flange and a mating flange on a corresponding housing with a separator plate sandwiched between the flange on the cover and the mating flange with the gasket isolating noise between the two components.

The static gasket has a carrier 10 and an elastomeric seal 60. The gasket is formed with a thin carrier 10 that has a thickness that is less than 1.0 mm thick. The desired thickness of the carrier may vary between 0.005 mm to 0.95 mm, which is not to be taken as a limitation of the scope of the invention. The carrier is made of a polymeric material such as Nylon®, Mylar®, Kapton®, polybutylene terephthalate (PBT), polyethylene naphtlate (PEN) or polyethylene terephthalate (PET). Nylon®, Mylar®), Kapton® are registered trademarks of DuPont. Optionally, the carrier 10 may be made of a polymer material such as polyester, polyamide, silicone, polyimide, or polyethersulphone. Further optionally, the carrier 10 may be made of a thin layer of metal or foil made of steel, brass, aluminum, magnesium, or stainless steel. Still further optionally, the carrier 10 may be a rubber coated metal layer and the carrier 10 may also, optionally, be a gas diffusion layer, a graphite plate, a proton exchange membrane, a layer of non-woven material, a fiber board used in making cellulose composite gaskets, a woven fabric, a ceramic layer, or any other material suitable for practicing the invention. The layer of non-woven material may be made of polyester, polyolefin, metal or ceramic or any other material suitable for the application. It is desirable for the carrier 10 to become stiffened by the formation of an elastomeric seal 60 on the carrier 10 so that the seal 60 adds sufficient stiffness to the carrier 10 to facilitate handling and ease of assembly of the gasket. Alternatively, the material used to make the carrier 10 may be made of relatively less compliant material to facilitate the handling of the seal prior to placing the seal against the mating component surface in the application. The ultimate choice for the relative compliance of the material used to make the carrier 10 is made by taking into account the surface temperature, fluid medium to be sealed and the application constraints, including component geometry, tolerance stack-ups, ease of assembly, the material used in the mating component, and the mating surface's flatness and roughness. The carrier 10 has a top or one surface 12, an opposite surface or side 14 and a web portion between the top surface 12 and the opposite surface 14. The web portion may optionally extend radially outward of the periphery of the gasket to aid in assembly of the gasket.

The elastomeric seal 60 is disposed on one side or top surface 12 of the carrier 10. The elastomeric seal 60 has a base 65 that includes a tab portion 66. The sealing portion 61 projects above the base 65 of the seal 60. The seal 60 has a pair of sides that form the edges of the base 65. The tab portion 66 may optionally have a different height than the base 65 and may be formed separately.

It is desirable for the height $H_1$ of the base 65 that is above the one or top surface 12 of the carrier 10 to be less than the height $H_2$ of the sealing portion 61 that is above the base 65 of the seal 60. Alternatively, $H_1 = H_2$ and, further optionally, $H_1$ may be greater than $H_2$ depending on the application requirements. It is desirable that the $H_1$ plus $H_2$ are less than 11.0 mm. The base 65 and the tab portion 66 are contiguous to the top surface 12 of the carrier 10.

The sealing portion 61 has at least one sealing bead 62 on the base 65. The bead 62 is shown in the shape of a triangle but this is not to be taken as a limitation of the invention. The shape of the sealing bead 62 may optionally be a semicircle on a surface forming the top of the base 65. Additionally, the elastomeric seal 60 may optionally utilize any other suitable shape to make a sealing bead 62 so long as it produces an adequate sealing force to prevent the migration of fluid past the seal. For example, the sealing bead 62 may be rectangular, square, polygonal, semiw elliptical, semi-oval, semi-round, truncated triangular, or any other suitable bead shape that prevents the migration of fluid across the sealing bead 62.

In the uncompressed state, the desired sealing bead 62 has an apex 64 above the top surface of the bead 65. In the compressed state, that is when the seal 60 is clamped against a mating surface and a clamp load is imposed by the mating surfaces, the apex 64 may be compressed into the base 65. As stated earlier, the apex 64 has a height $H_2$ above the base 65. The apex 64 may be compressed up to 100% of the height $H_2$ so as to compress the apex 64 completely into the base 65. Optionally, it may be compressed between 1.5% to 95% so long as a sufficient high line sealing pressure is developed in the apex 64 to prevent the migration of fluid across the apex 64. In the event that the apex 64 of the sealing portion 61 is compressed 100% of the height of $H_2$, the base 65 becomes a compression limiter between the joint. In this condition, the shape factor of the base 65 is between 0.1 to 100 and optionally it is between 0.15 to 100. The use of the terms "shape factor" and "bulging" will be discussed in more detail later on.

When the gasket 100 is subjected to a clamp load, the seal 60, because it is more compliant, will create a high line sealing pressure at the apex 64 of the bead 62 preventing the migration of fluid across the apex 64 without producing a correspondingly high sealing force (or load) against the entire mating surface of the component which is to be sealed. This is desirable in certain applications such as in a fuel cell where a seal pressing against a brittle component such as graphite bipolar plate or flow field plate that can create high stress in the adjacent plate or mating surface and ultimately may cause the plate to crack, for example, if the high sealing force exceeds the plate's material strength capability.

It is desirable for the tab portion 66 and the base 65 of the seal 60 to be formed of the same polymeric material. Alternatively, the tab portion 66 may be made of a different polymer than the material used to form the base 65 of the elastomeric seal 60. The seal 60 may be made of a polymer such as silicone, fluorosilicone, butyl, fluorocarbon, ethylene-acrylate, polyacrylate, fluoropolymer, isoprene, epichlorohydrin, EPDM, nitrile, hydrogenated nitrile (HNBR), thermoplastic elastomer (TPE), thermoplastic vulcanizate (TPV) or any other polymer which is suitable for practicing the invention.

The preferred polymers used in forming the seal 60 are reaction cured. Reaction cured elastomers include addition ion, catalytic, ultraviolet, infra-red radiation, condensation and free radial cure. When using conventional reaction cured elastomers, a primer coat or adhesive may be applied to the top surface 12 of the carrier 10 to enhance the bond of the elastomer seal 60 to the carrier 10. The primer coat may be silane based or a phenolic resin. Silane based and phenolic resin primers are well known in the art and are used extensively with elastomers. Examples of silane based primers are: General Electric Company of Waterford, N.Y., Rohm & Hass of Philadelphia, Pa., Thixon® Product Number 304; and Lord Corporation, of Erie, Pa., Chemlock Products Numbers 607 and 608. Rohm & Haas also produces Solvent Based Product Numbers 2000, 05N-2, P15, 300, 715, 720 and Thixon® Water Based Products Numbers 2500, 7002, 7010, 7011 and 7015. Other primer coats are well known in the art. Thixon® is a registered trademark of Rohm & Hass.

Optionally, the elastomers may be self bonding which eliminates the need to apply a primer coat or adhesive to enhance bonding of the elastomer to the top surface 12 of the carrier 10. Examples of self bonding silicone elastomers are available from Wacker Silicones of Adrian, Minn., Product Serial Nos. LR 3070, LR 3071, LR 3072, and LR 3073. Self bonding silicone elastomers are also made by ShinEtsu of Tokyo, Japan and General Electric Co. Other self bonding elastomers include nitrile, HNBR, EPDM, butyl, fluorocarbon, ethylene acrylate, fluoropolymers, fluorosilicone, isoprene, and epichlorohydrin.

In the most desired construction, the elastomeric seal 60 is made of an elastomer and sized with a shape factor along with the elastomer's material properties, such as Durometer number, so as to limit the bulging of the faces of the sealing portion 61 as a compressive load is applied to the apex 64. As stated earlier, in the event that the apex 64 of the sealing portion 61 is compressed 100% of the height $H_2$, the base 65 functions as a compression limiter between mating surfaces of the joint with a shape factor that limits the bulging of the sides of the base 65. Shape factor is defined as the ratio of the area of the loaded elastomeric face divided by the total area of the elastomer that is free to bulge as defined in the American Chemical Society, Rubber Division, of Akron, Ohio, Intermediate Rubber Course, Edited 1985, and incorporated herein by reference. Bulging is a term used in elastomeric technology to denote the distortion of the unloaded side faces of an elastomeric seal member in response to a load applied on the top elastomeric face of the sealing member. The range of shape factors in the sealing portion 61 is between 0.15 to 10, and, optionally, it is between 0.2 to 10. The base 65 has a desired shape factor between 0.1 to 100, and optionally between 0.15 to 10, and, further optionally, between 0.2 to 1.0.

Figure 7:
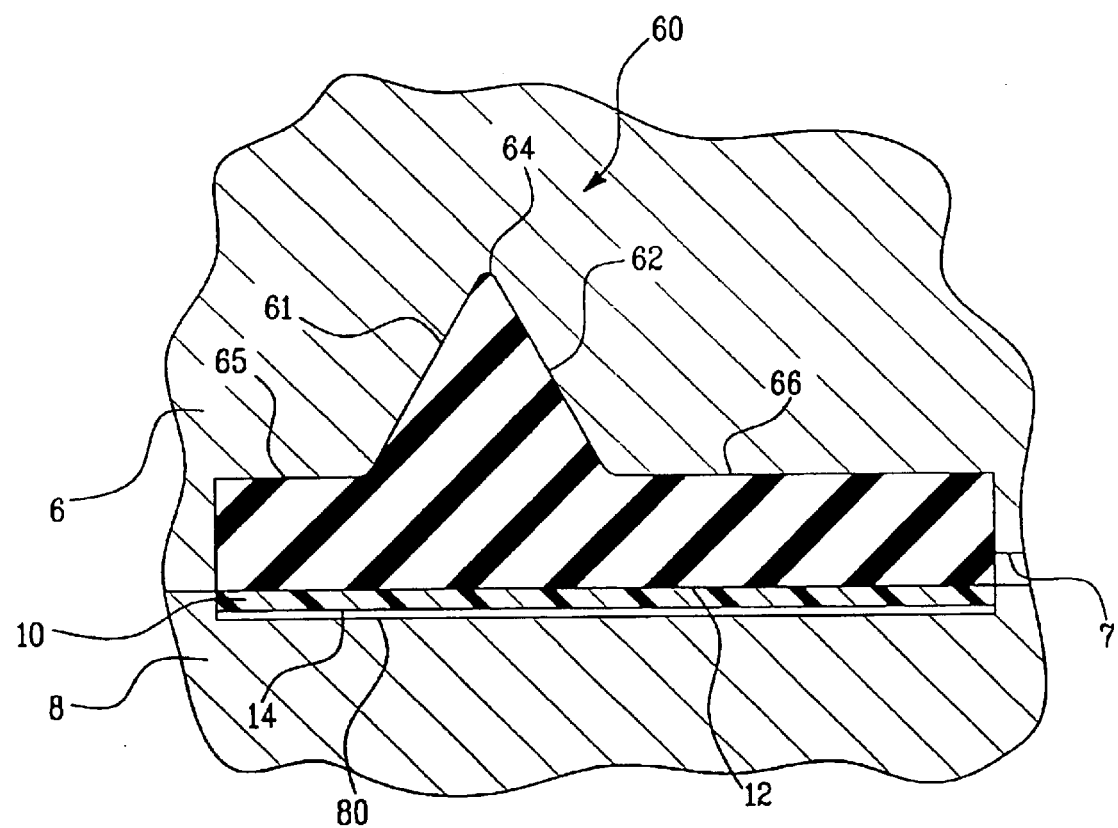
FIG. 7 is an enlarged cross sectional view of a mold for making the gasket.

In making the elastomeric static gasket 100, the carrier 10 is clamped between the cavity in one mold half 6 and the cavity in the other mold half 8 of a conventional molding machine as shown in FIG. 7. If a conventional elastomer is used, then a primer coat is applied to the top surface 12 of the carrier 10 prior to molding prior to receiving the elastomer. If a self-bonding elastomer is used, it may not be necessary to use a separate primer coat on one top surface 12 of the carrier 10. The uncured polymer or elastomer material is dispensed into the cavity through a port 7 in the mold so that the elastomer flows through the port 7 into the space between the carrier 10 and into the cavity halves of the molds 6, 8, respectively, so as not to deform the carrier 10 until the cavity halves of the molds 6, 8 are filled and the elastomeric seal 60 is formed. The polymeric or elastomeric material is heated in order to enhance its flow into the cavity halves of the molds 6, 8. The polymeric material is heated to a sufficient temperature so as to cure the polymer to form the elastomeric seal 60 on the top surface 12 of the carrier 10. Optionally, the polymer material used to form the elastomeric seal 60 may be dispensed by depositing, injecting, transferring, forming in place, applying by roll coating or screen printing onto the one surface 12 or by any other material dispensing method suitable for practicing the invention.

Before the elastomeric seal 60 is formed on the carrier 10, it has been found to be advantageous to apply a coat or layer of a pressure sensitive adhesive 80 to the other or opposite surface 14. The pressure sensitive adhesive is selected from adhesive materials such as a silicone based Product 595, made by General Electric Co. of Waterford, N.Y., or PSA 25225, made by Wacker Silicones of Adrian, Mich. The adhesive material may also be an acrylic based adhesive such as that described in U.S. Pat. No. 3,994,764 or a butyl based adhesive, a polyvinyl acetate based, or a polyether silicone based, as is conventional.

After the elastomeric seal 60 and pressure sensitive adhesive 80 are applied to the carrier 10, the entire assembly is conventionally die cut to form the outer periphery and the inner periphery of the static gasket 100 as required by the application. Optionally, the tab portion 67 is formed by die cutting the tab portion 66 into sections, which will be described later on. The use of the static gasket 100 with a fuel cell 90 will now be described.

A single fuel cell 90 consists of a first flow field plate 92 and a second flow field plate 92', a first gas diffusion layer 94 and a second gas diffusion layer 94', and an ion exchange polymer membrane 96. To seal the fuel cell 90, two static gaskets 100 and 100' are required. Those skilled in the art will recognize that gasket 100 and gasket 100' are identical and the prime numerals used to describe the gasket 100' are the same elements used to describe the gasket 100. Similarly, a first gas diffusion layer 94 is identical to the second gas diffusion layer 94' and the first flow field plate 92 is identical to the second flow field plate 92'.

The first gas diffusion layer 94 is placed on one side of the ion exchange polymer membrane 96. The layer of pressure sensitive adhesive 80 on the opposite surface 14 of the carrier 10 is placed on the ion-exchange polymer membrane 96 and the tab portion 66 overlays a portion of the gas diffusion layer 94 so as to put a compressive force on the layer 94. The second gas diffusion layer 94' is placed on the other side of the ion exchange polymer membrane 96. Similarly, the pressure sensitive adhesive 80' is placed on the ion-exchange polymer membrane 96 and the tab portion 66' overlays a portion of the layer 94' so as to put a compressive force on the layer 94'. Thus, the ion-exchange polymer membrane 96 forms into an subassembly 98 which includes a first gas diffusion layer 94 and a gasket 100 as well as a second gas diffusion layer 94' and a gasket 100'. The pressure sensitive adhesive 80 adheres to the one side of the ion-exchange polymer membrane 96 and the pressure sensitive adhesive 80' adheres to the other side of the ion-exchange polymer membrane 96. The first flow field plate 92 is placed against the elastomeric seal 60 of the static gasket 100 and the second flow field plate 92' is placed against the elastomeric seal 60' of the static gasket 100' to form a single fuel cell 90.

In operation, fluids that are either gaseous or liquid are separately supplied on one side and the other side of the subassembly 98 through passages, channels or openings in the flow field plates 92, 92', as is conventional. Once fluid flows through the one side of the subassembly 98 through the first flow field plate 92 to the anode, the platinum catalyst in the first gas diffusion layer 94 promotes the separation of the fluid into protons and electrons. On the opposite side of the subassembly 98, the fluid flows through the second flow field plate 92' to the cathode where the platinum catalyst in the second gas diffusion layer 94' attracts protons from the one side of the subassembly 98. The electrons are captured as useful electrical energy through an external circuit (not shown). At the cathode, the electrons from the external circuit and the protons combine to form a chemical byproduct and heat. The gasket 100 and 100' prevent the migration of the fluids across the sealing bead 62 of the elastomeric seal 60 that is compressed against the mating surface of the first flow field plate 92 and across the sealing bead 62 of the elastomeric seal 60' that is compressed against the mating surface of the second flow field plate 92'. The pressure sensitive adhesive 80 prevents the migration of fluids between the one side of the ion exchange polymer membrane 96 and the bottom or opposite surface 14 of the carrier 10. Similarly, the pressure sensitive adhesive 80' prevents the migration of fluids between the other side of the ion exchange polymer membrane 96 and the bottom surface 14' of the carrier 10'.

In another aspect of the inventive concept, the tab portion 66 is divided into a mechanically engaging portion 67 and an adhesive engaging portion 68 on gasket 100. Similarly, the tab portion 66' has a mechanically engaging portion 67' and an adhesive engaging portion 68' on gasket 100'. For the sake of clarity only the tab portion 66 of the gasket 100 will be described since it is identical to tab portion 66'. The mechanically engaging portion 67 is disposed within a complimentarily shaped cut-out 95 in the gas diffusion layer 94. The external shape of the engaging portion 67 and the shape of the cut-out or aperture 95 are complimentary, that is, they cooperatively engage each other for form a lock. By way of example, the portion 67 may be a partial square 67*a*, a partial triangle 67*b*, a partial arcuate 67*c* or *a* partial polygonal shape 67*d*, which is not to be taken as a limitation of the invention. The cut-out 95, by way of example, may have a corresponding shape, such as a square 95*a*, triangle 95*b*, partial arcuate 95*c* or *a* polygonal shape 95*d*, which is not to be taken as a limitation of the invention, so that the shape of portion 67 fits into an aperture of the corresponding cut-out 95. Thus, the mechanically engaging portion 67 engages the corresponding cut-out 95 in the gas diffusion layer 94 to positively engage the gas diffusion layer 94 and to prevent the gas diffusion layer 94 from moving or shifting out of alignment relative to the gasket 100 and the polymer membrane 96 during assembly. The adhesive engaging portions 68, 68' overlay a portion of the gas diffusion layers 94, 94' to adhesively bond to the respective layers and compress a portion of the layers 94, 94' adjacent to the tab portions 66, 66', respectively.

In addition to the previously described application, the gasket according to the present invention has use in other applications such as in water pumps, front covers, cam covers, throttle bodies, carburetors, fuel valves, flexible printed circuits, air conditioning units, intake manifolds, water outlet connectors, thermostat housings, oil pans, and other applications where the thickness of the gasket must be minimized between support flanges because of application height restrictions. In these applications, the tab portions can be made to adhere to an intermediate member such as a flow reducer, thermostat, baffle plate, separator plate, or optionally, may be eliminated when not required for one of the above applications. It is to be understood that the above examples are not to be taken as a limitation of the invention.

While the invention has been described with one embodiment, it is not intended to limit the scope of the invention to the embodiment disclosed but to embrace all variations within the scope of the appended claims.

What is claimed is:

1. A sealing arrangement for a fuel cell, comprising:
a membrane electrode assembly having a first side and a second side;
a gas diffusion layer disposed on at least one of said first and second sides of said membrane electrode assembly;
a separator plate including a first set of flow channels, said separator plate being disposed next to said gas diffusion layer; and
a gasket disposed between said membrane electrode assembly and said separator plate and having an outer perimeter portion defining an opening which receives said gas diffusion layer, said gasket including at least one first tab portion extending into said opening between said gas diffusion layer and said separator plate.

2. The sealing arrangement according to claim 1, wherein said at least one tab portion is integrally formed with said outer perimeter portion.

3. The sealing arrangement according to claim 1, wherein said gasket includes a carrier layer and an elastic seal layer mounted thereto.

4. The sealing arrangement according to claim 3, wherein said carrier is adhesively bonded to said membrane electrode assembly.

5. The sealing arrangement according to claim 1, wherein said gasket is adhesively bonded to said membrane electrode assembly.

6. The sealing arrangement according to claim 1, wherein said gasket
includes an elastomeric sealing bead engaging said separator plate.

7. The sealing arrangement according to claim 1, wherein said at least one tab portion includes a plurality of tab portions extending into said opening between said gas diffusion layer and said separator plate.

8. The sealing arrangement according to claim 1, wherein said gas diffusion layer includes at least one cut out portion on an edge portion thereof, said gasket including at least one second tab portion received in said at least one cut out portion of said gas diffusion layer.

9. The sealing arrangement according to claim 8, wherein said at least one second tab portion is disposed adjacent to said at least one first tab portion.

10. The sealing arrangement according to claim 8, wherein said at least one second tab portion is adhesively bonded to said membrane electrode assembly.

* * * * *